Sept. 1, 1936.  A. F. STURM  2,052,906

ACCOUNTING MACHINE

Filed June 21, 1935  7 Sheets-Sheet 2

INVENTOR

BY Morrison, Kennedy & Campbell
ATTORNEYS

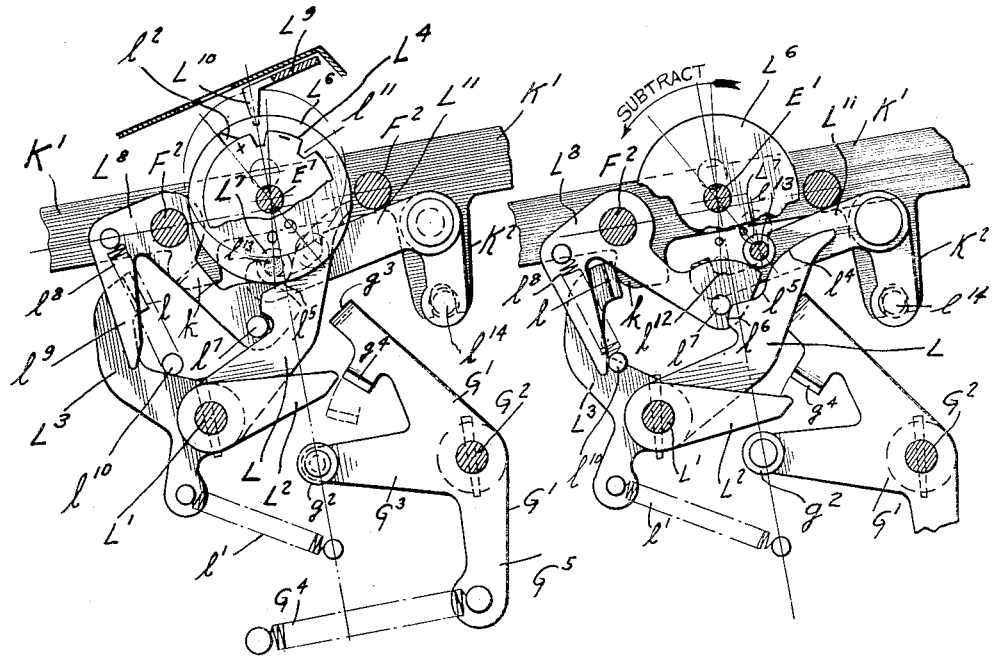
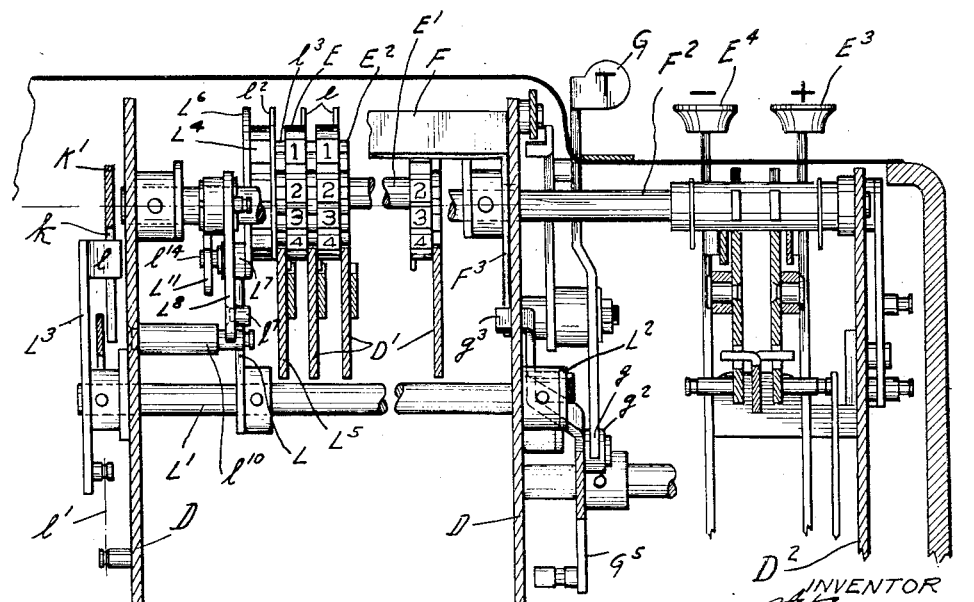

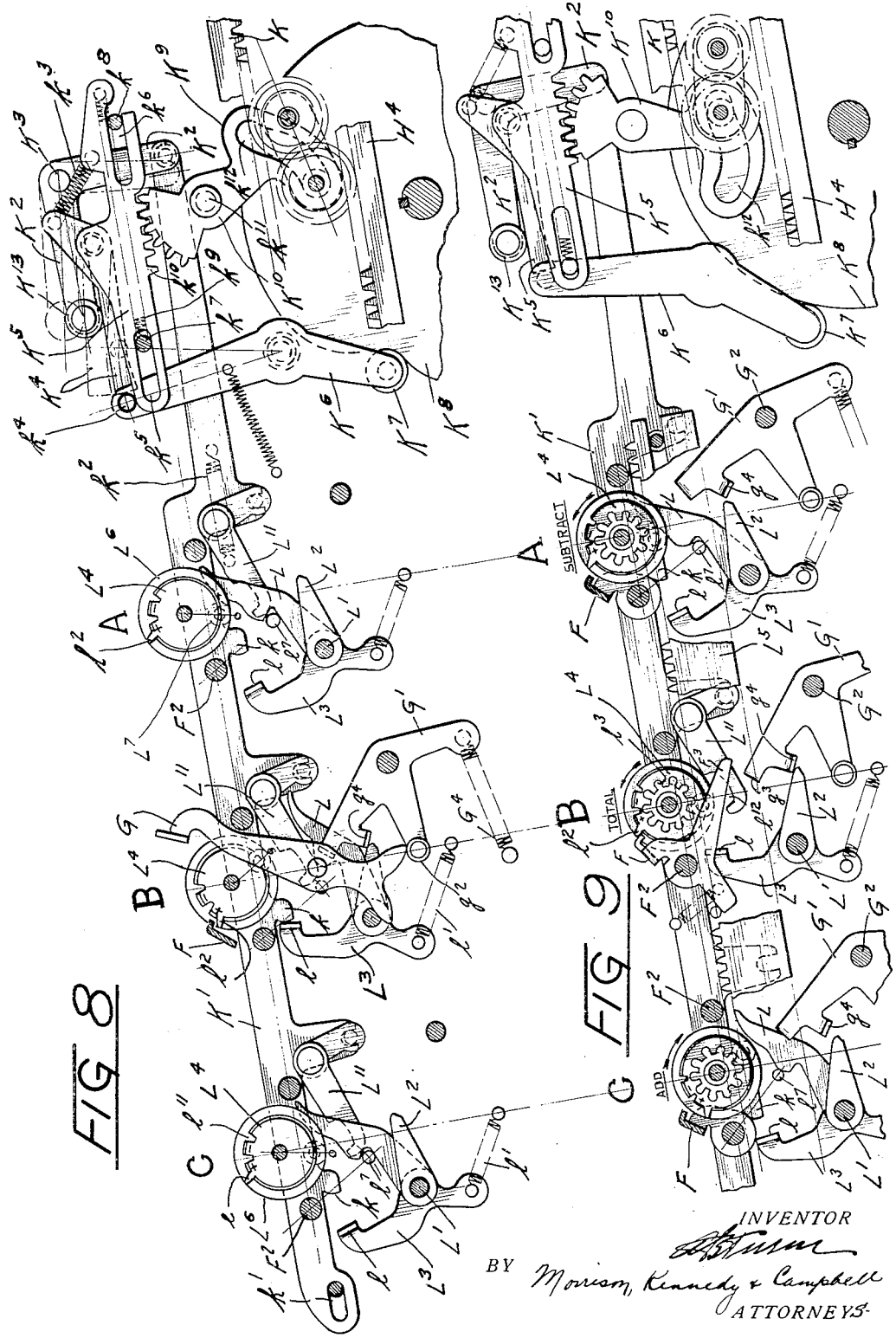

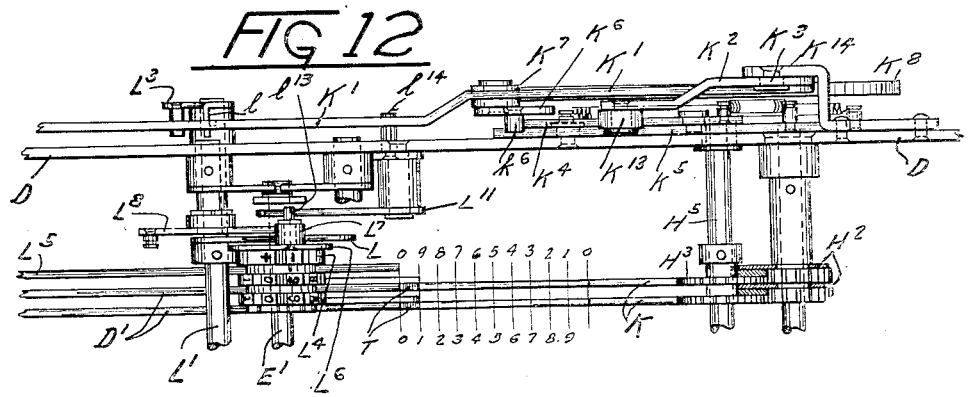
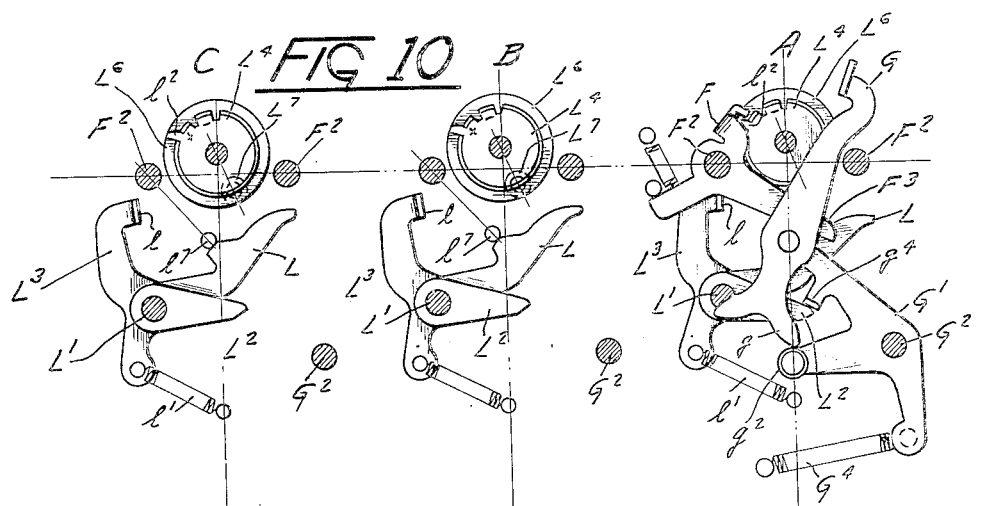
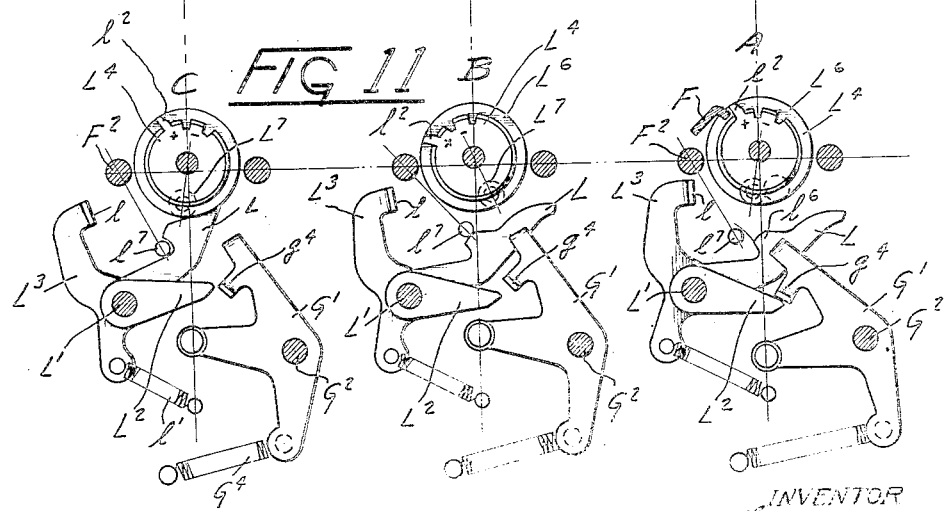

Sept. 1, 1936.  A. F. STURM  2,052,906
ACCOUNTING MACHINE
Filed June 21, 1935   7 Sheets-Sheet 6
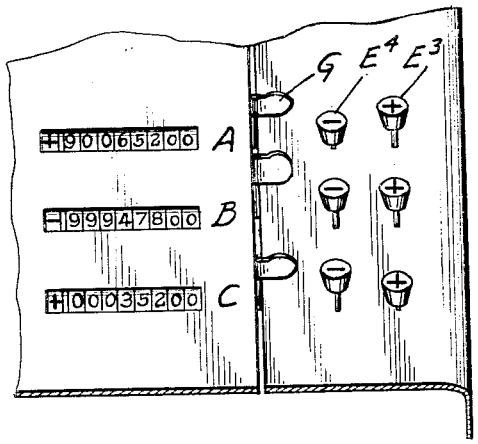
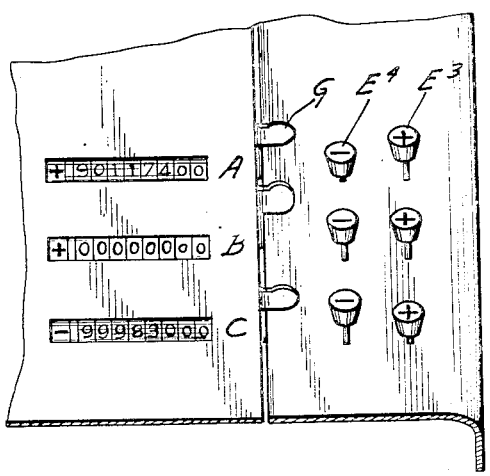
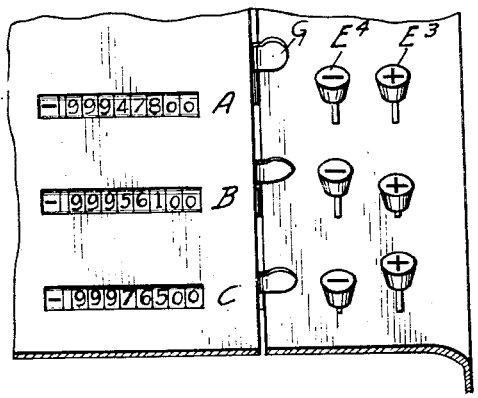
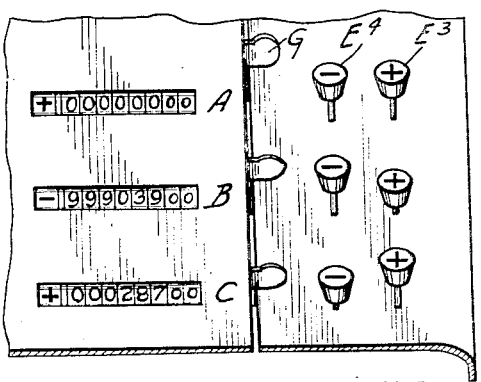
INVENTOR
BY
Morrison, Kennedy & Campbell
ATTORNEYS Sept. 1, 1936.  A. F. STURM  2,052,906
ACCOUNTING MACHINE
Filed June 21, 1935   7 Sheets-Sheet 7
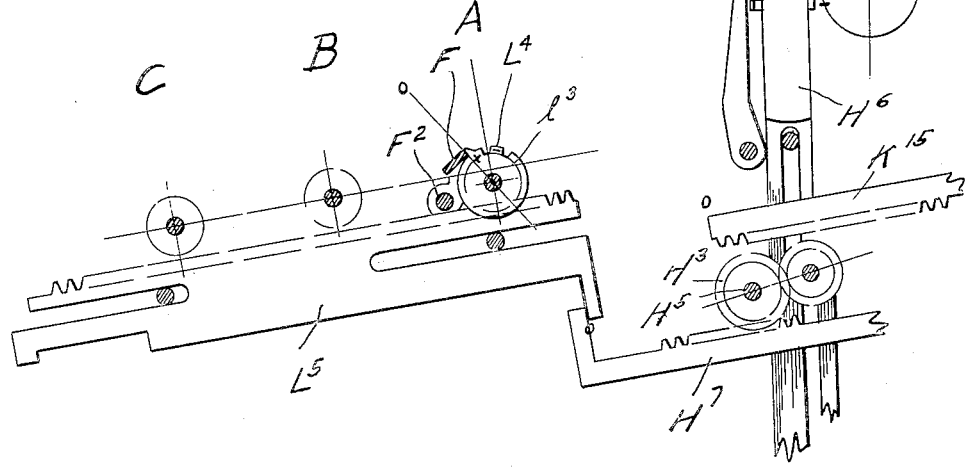
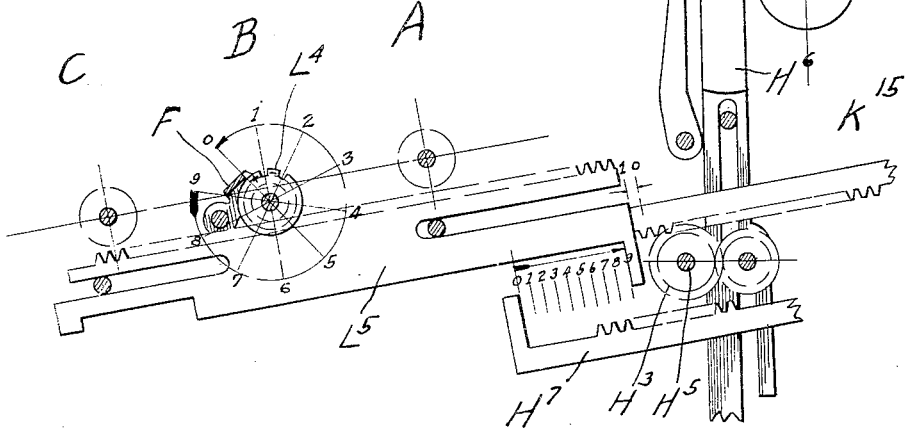
INVENTOR
BY *A. F. Sturm*
*Morrison, Kennedy & Campbell*
ATTORNEYS Patented Sept. 1, 1936

2,052,906

UNITED STATES PATENT OFFICE 2,052,906

ACCOUNTING MACHINE

Ansgar F. Sturm, New Dorp, Staten Island, N. Y., assignor to Mergenthaler Linotype Company, a corporation of New York Application June 21, 1935, Serial No. 27,690

21 Claims. (Cl. 235—60)

This invention relates to accounting machines of the general organization disclosed in my copending application, Serial No. 625,590, filed July 29th, 1932, wherein there are provided a plurality of accumulators capable, upon selection, of independent association with a plurality of common actuating rack bars through which amounts may be entered in the accumulators by addition or subtraction and through which also the accumulators may be selectively associated with printing mechanism for printing amounts registered therein if positive or the complements thereof if negative, and wherein there is also provided means for transferring an amount registered in one accumulator to a second accumulator by addition or subtraction or to a second accumulator by addition, and to a third accumulator by subtraction.

More particularly, the invention is directed to a total transfer mechanism, whereby an amount, whether positive or negative, registered in one accumulator may be transferred to another accumulator by addition or subtraction to register therein the correct algebraic sum or difference of the amounts in the two accumulators, and characterized by the fact that the accumulators are provided with devices for conditioning the printing mechanism to print the amount registered in an accumulator if positive or the complement thereof if negative, which devices, during the transfer of an amount from one accumulator to another, are settable from the first accumulator so as to permit the correct printing of the result in the second accumulator, that is, the amount registered if positive or the complement thereof if negative.

One of the features of the invention resides in what, for want of a better name, will be termed a character unit associated with each accumulator and including in part a character wheel bearing indications plus and minus. When an accumulator registers zero or a positive amount, the character wheel is set to display the plus sign, whereas when the accumulator registers a negative amount, such wheel will display the minus sign, thus indicating visibly to the operator the character of the amount registered. Furthermore, when the plus sign is displayed, the character unit of which the character wheel forms a part, will, upon totalling the accumulator with which it is associated, condition the printing mechanism through a character link to print the amount registered in such accumulator, whereas, when the minus sign is displayed, such unit will condition the printing mechanism likewise through the character link to print the complement of the amount registered. The advantages of these features will be apparent if the various conditions present in the transferring of totals are considered.

The transferring of positive amounts presents little difficulty, for obviously if a positive amount is transferred from one accumulator to another accumulator in which there already is a positive amount, the amount registered in the second accumulator will still be positive and the problem of printing the amount from the second accumulator presents nothing new. Likewise if a positive amount is transferred from one accumulator to a second accumulator by subtraction, the amount in the second accumulator either will be positive or negative, depending upon the quantity transferred, but regardless of the result, machines have been designed whereby the amount if positive or the complement thereof if negative may be automatically printed.

The transferring of negative amounts however presents an entirely different problem. For instance, if a negative amount in one accumulator is transferred by addition into an accumulator containing a positive amount, the proper result is an amount representing the algebraic sum of the two amounts, and it may be such amount is negative in character depending upon the relative values of the two amounts. As the new amount has been arrived at as a result of an adding operation, there is nothing in the machines with which applicant is familiar to indicate either to the operator or to the machine that such amount is negative and, upon totalling the second accumulator, the amount therein rather than its complement will be printed, unless, indeed, some device, such as that herein disclosed for automatically taking care of the situation is provided. Likewise in transferring a negative amount from one accumulator to another by subtraction, an amount representing the algebraic difference should result in the second accumulator which again may be positive or negative, depending upon the relative values of the amounts. And again, so far as applicant is aware, no machines have been provided for printing a positive amount from an accumulator where such accumulator, originally registering a negative amount, has been caused to register a positive amount as the result of a subtraction operation. In the improved machine, mechanism has been provided controlled from the accumulator from which the transfer is made to set the conditioning mechanism of the second accumulator to which the amount is transferred, so that upon totalling the latter, the amount therein will be printed if positive or the complement thereof if negative, irrespective of whether such amount has been arrived at as a result of an addition or a subtraction operation.

Referring to the drawings:

Fig. 5 is a view of the character unit, with the parts set to condition the machine for printing a positive amount;

Fig. 6 is a view similar to Fig. 5, but showing the parts set to condition the machine for printing a negative amount;

Fig. 7 is a vertical section through a portion of the machine and showing an accumulator and its associated character unit;

Figure 1:
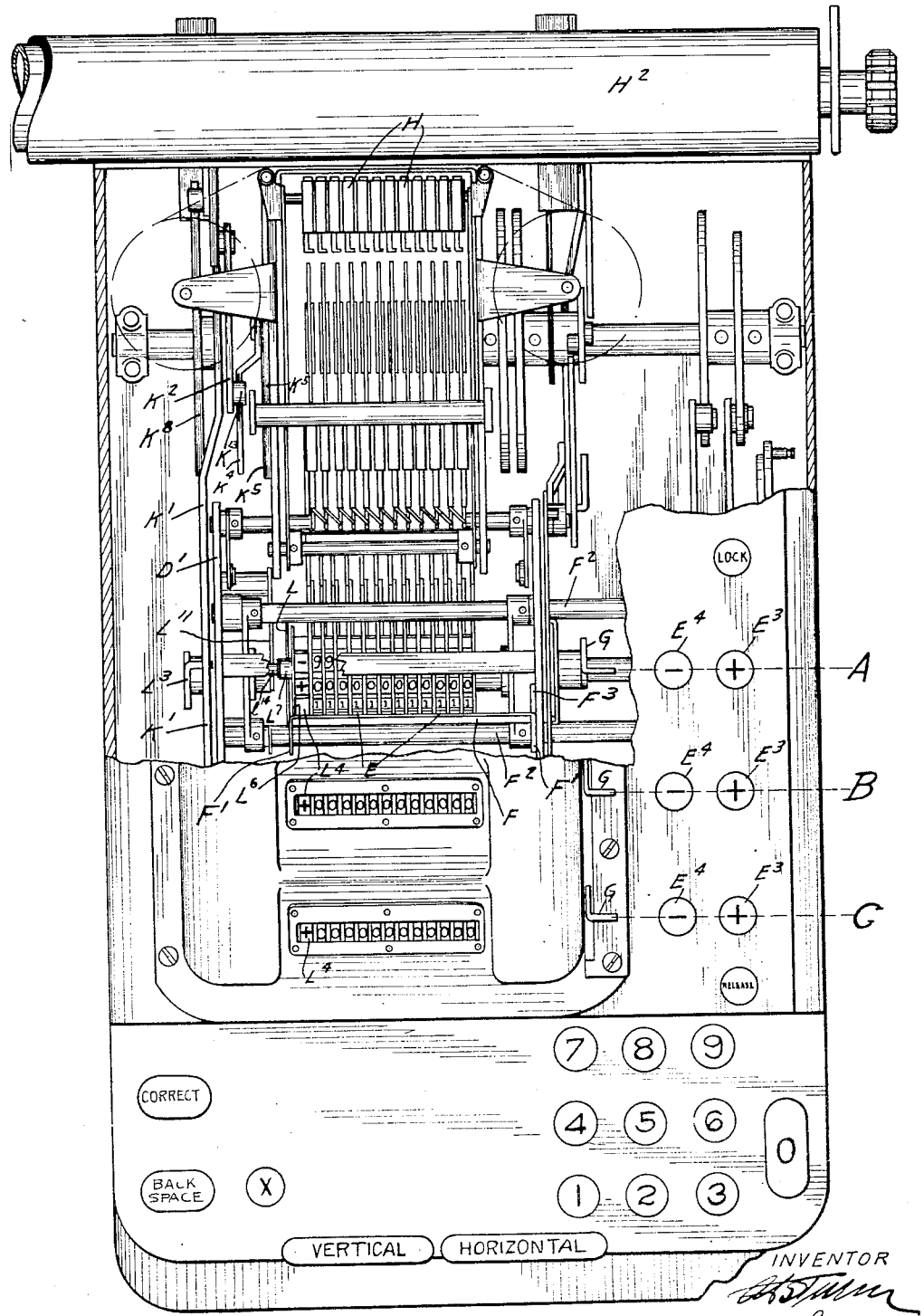
Fig. 1 is a plan view of the improved machine with a portion of the casing broken away, and showing the parts in their normal position.

Fig. 8 is a view of a portion of the machine, illustrating the character units of three accumulators, one wherein a negative amount is registered and with the parts set for conditioning the machine to print, upon totalling, the complement of the amount in such accumulator, and with the character units of the other two accumulators in the position they would assume if positive amounts were registered therein;

Fig. 9 is a view similar to Fig. 8, but immediately after the negative amount has been totalled and showing the character units of the other accumulators after the negative amount has been transferred to one by subtraction and to the other by addition;

Fig. 10 is a diagrammatic illustration of the character units of three accumulators, and with the parts in the position they would assume if a negative amount were registered in each accumulator;

Fig. 11 is a view similar to Fig. 10, but with the parts in the position they would assume after a negative amount has been transferred to one accumulator by addition and to another accumulator by subtraction;

Fig. 12 is a plan view of a portion of the machine, showing a part of an accumulator, the character unit associated therewith, and a portion of the printing actuating mechanism;

Fig. 13 is a plan view of a portion of the machine, illustrating three accumulators, one registering a negative amount and the others positive amounts, and with the parts set for transferring the negative amount from the accumulator wherein it is registered, to the other accumulators, to one by addition and to the other by subtraction;

Fig. 14 is a view similar to Fig. 13, but with the accumulators registering the amounts resulting from the operations indicated in Fig. 13;

Fig. 15 is a view similar to Fig. 13, but with all of the accumulators registering a negative amount, and with the parts set for transferring the negative amount registered in one accumulator to another accumulator by addition, and to the third accumulator by subtraction;

Fig. 16 is a view similar to Fig. 15, but with the accumulators registering the amounts resulting from the operations indicated in Fig. 15;

Fig. 17 is a view, partly diagrammatic, illustrating the printing of the character of the amount in an accumulator when such amount is positive; and Fig. 18 is a view similar to Fig. 17, but illustrating the printing of the character of the amount in an accumulator when such amount is negative.

The invention has been illustrated as applied to the accounting machine disclosed in the Sturm application before alluded to and to which reference may be had for a more detailed description of the parts and the actuating mechanisms.

Briefly, the machine includes a series of accumulators A, B, C etc., arranged one behind the other in tandem relation between side frames D of the machine (Figs. 1 and 7) and which in their normal position are raised clear of a set of fore-and-aft reciprocable rack bars $D^1$ positioned directly therebeneath. The accumulators consist each of a plurality of individually rotatable digit wheels E, mounted on a common shaft $E^1$ and having their peripheries divided into ten spaces, numbered respectively from 1 through 9 and zero, in a counter-clockwise direction looking at the machine from the right. Further, the digit wheels are provided with pinions $E^2$ which, in the operation of the machine, will mesh with the underlying rack bars and provided also with projections $e$ between the numerals zero and 1 and which act to arrest the digit wheels in the zero position by banking against a stop bar F during totalling in a manner which will hereinafter be described.

Figure 2:
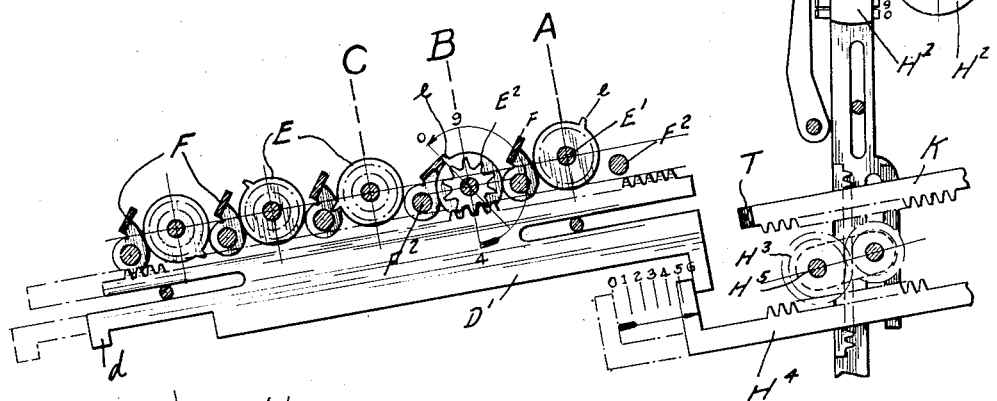
Fig. 2 is a view, partly diagrammatic, illustrating the operation of the parts during the printing of a positive amount appearing in an accumulator.

The accumulators are each provided (see Figs. 1 and 13 to 16) with three keys, an add key $E^3$, a subtract key $E^4$, and a total key G arranged immediately adjacent the respective accumulators at the right, by which the accumulators may be selected for an operation in addition, subtraction or totalling and, when an accumulator has been selected, say for a subtraction operation by the depression of its respective subtract key, such accumulator will, upon the inauguration of a machine cycle of operation, be lowered (through mechanism not shown) into mesh with the underlying rack bars $D^1$ prior to the movement of the latter to the rear, the extent of movement of such bars (when the machine is operated in the usual way for entering amounts in the accumulators) being determined by a series of stops (not shown) which are projected into the paths of lugs $d$ formed at the front ends of the rack bars, by finger keys arranged at the front of the machine (Figs. 1 and 2). As the digit wheels of the accumulator are engaged with the rack bars prior to the rearward movement of the latter, they will be rotated in a counter-clockwise direction, and consequently an amount will be registered therein by subtraction. After the rack bars $D^1$ have been brought to rest at the end of their rearward stroke as determined by the setting of the stops previously mentioned, the accumulator is disengaged from the rack bars and the latter moved forwardly to their normal position of rest.

On the other hand, if an accumulator is selected for operation in addition as by pressing the add key $E^3$ associated therewith, the rack bars will be moved rearwardly prior to the engagement of the accumulator therewith until arrested as before by the stops previously referred to, whereupon the accumulator will be lowered into engagement with the rack bars and the latter moved forwardly, thus turning the digit wheels in a clockwise direction to register an amount therein by addition, such amount, of course, being determined by the extent of forward movement of said bars. After the rack bars $D^1$ have been returned to normal position, the accumulator is raised out of engagement therewith. Obviously, the accumulators are provided with carrying mechanisms for a purpose well understood in the art and, as far as the present invention is concerned, any carrying mechanism may be employed. By way of example, the carrying mechanism shown in applicant's copending application referred to before, will suffice. With such an arrangement, it is apparent that by depressing the add key of one accumulator and the subtract key of a second accumulator, a number may be added in the first accumulator and subtracted in the second accumulator in one cycle of operation of the machine.

The printing mechanism H (see Figs. 2 and 3) is arranged at the rear of the rack bars $D^1$ and includes a set of vertical slides $H^1$ or type bars which are movable individually upwardly through ten active spaces from 0 to 10 to locate one or another of a series of type elements $h$ into operative relation with a platen $H^2$ (it being understood that after moving through ten active spaces, zero also will be printed for reasons which will be hereinafter pointed out) and thereafter downwardly to restore the slides to normal position. The upward movements of the slides $H^1$ are effected by pull springs (not shown) and are controlled by the rearward movement of the rack bars through intermediate gear sets $H^3$ and one or another of a series of auxiliary rack bars $H^4$ and K, respectively.

In printing a positive total appearing in any one of the accumulators, the keyboard and stops referred to before, are not used and the selected accumulator is engaged with the main rack bars $D^1$, as in subtraction, that is prior to their movement in the rearward direction. In such instances, the stop bar F (one being associated with each of the accumulators) is swung rearwardly into a position to engage the lugs $e$ formed on the digit wheels E so as to arrest the latter in the zero position as they are turned counter-clockwise by the main rack bars. As the digit wheels are arrested, the corresponding rack bars $D^1$ will also be arrested through their engagement with the digit wheel pinions $E^2$, in different positions according to the extent of rotation of the individual digit wheels, and the type bars $H^1$ will be allowed to rise a corresponding number of spaces to locate the proper type elements $h$ in printing position. Thus, if a main rack bar $D^1$ is allowed to move rearwardly, say six spaces, the type bar $H^1$ corresponding thereto likewise will move through six spaces, the lower auxiliary set of rack bars $H^4$ under such circumstances being allowed to travel through a range of movement equivalent to the traversed portion of the range of movement of the main rack bars (see Fig. 2).

In printing a negative total, the selected accumulator is engaged with the rack bars $D^1$ prior to the movement of the latter in the rearward direction as before, and the stop bar F is lowered into position to engage the lugs on the digit wheels to arrest the latter in the zero position. In this way the extent of the rearward movement of the rack bars is controlled by the movement of the accumulator, but in this instance the extent of upward movement of the slides $H^1$ is controlled through the upper set of auxiliary rack bars K which are allowed to travel forwardly until they bank against the rear edges of the main rack bars, their movement thus being equivalent to the untraversed portion of the range of movement of said main rack bars, and in this way the complement of the amount in the accumulator will be printed, which, of course, is the true negative total (see Fig. 3).

Figure 3:
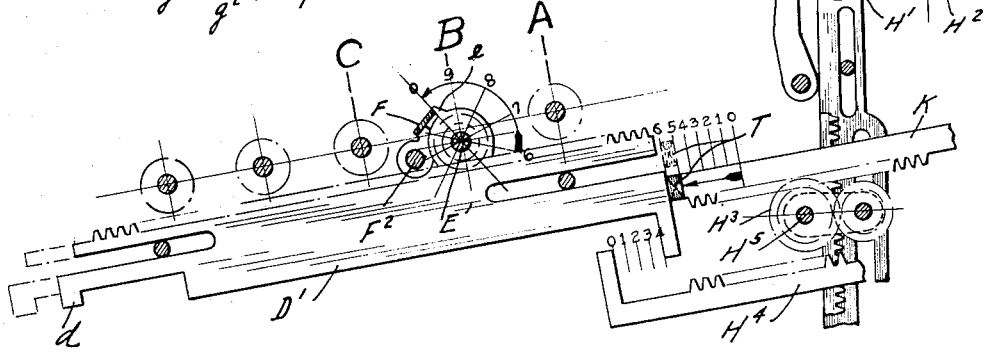
Fig. 3 is a view, partly diagrammatic, illustrating the operation of the parts during the printing of the complement of a negative amount appearing in an accumulator.

To be more specific, suppose for instance, the negative amount registered in the accumulator is 90420 (assuming a five place machine). The correct negative total to be printed is the complement of this amount or 09580. The movement of the main rack bars $D^1$ to the rear will be determined by the number registered in the accumulator as before mentioned, so that the first rack bar at the right will not move rearwardly at all, since its associated digit wheel registers zero. The second rack bar will move rearwardly through two spaces, the third, four spaces, the fourth will remain stationary, and the fifth will move through nine spaces. Now it will be seen that if the auxiliary rack bars K which control the movement of the type carriers are allowed to come forward to engage the main rack bars $D^1$, the first one will move forwardly through ten spaces, to bring the lower zero type bar in line which the platen $H^2$ for printing, the second auxiliary rack bar will move forwardly through eight spaces to bring the type bar bearing the numeral 8 in line for printing, but if all of the remaining rack bars are allowed to move forwardly through the untraversed range of movement of the rack bars, the digits printed in these places would be one higher than the correct value, were it not for the fact that each of the auxiliary rack bars above the first is provided with an interponent T arranged to be automatically positioned between the auxiliary rack bars K and the main rack bars $D^1$ in all those positions above the first digit wheel registering a number above zero, with the result that in the third position of the example cited, the auxiliary rack bar will be allowed to move forwardly through five spaces instead of six, the fourth rack bar, nine spaces instead of ten, and in the fifth place, the rack bar will move through zero active spaces instead of one and the correct negative total 09580 will be printed. The reason for the additional zero type bar is thus evident. In Fig. 3, there is illustrated the condition of the main and auxiliary rack bars in the third position of the example cited. The mechanism for operating the interponents T are fully described in my application alluded to before.

Figure 4:
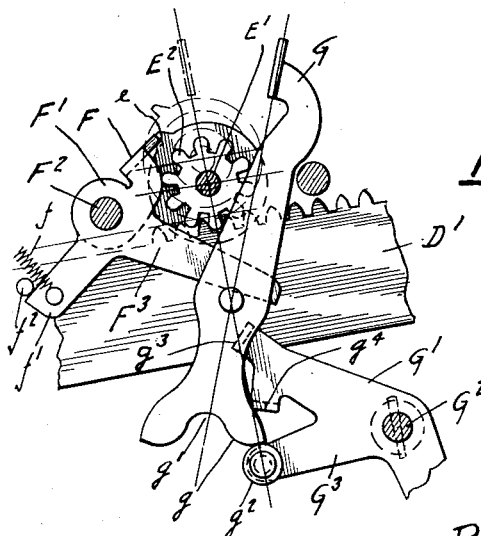
Fig. 4 is a view illustrating a portion of the totalling mechanism, and showing the parts in position for taking a total.

The totalling operations just referred to are effected by mechanism not fully shown but which is controlled from the total key levers G associated with each of the accumulators. When a total lever is pressed rearwardly (see Fig. 4), a number of different functions are performed preparatory to starting the machine. Thus the stop bar F is moved into the path of the lugs $e$ on the accumulator wheels, a retaining plate (not shown) but which normally holds the actuator rack bars $D^1$ against rearward movement, is pressed downwardly to release such rack bars, the associated add key $E^3$ is released in the event it has been locked down and the subtract key $E^4$ is depressed so that the selected accumulator will be engaged with the actuator rack bars $D^1$ prior to the rearward movement of the latter. The total levers G are pivoted to the right side frame D of the machine and are arranged to be rocked rearwardly in taking a total or forwardly in taking a sub-total (Figs. 4 and 7). The levers G are formed at their lower ends with a cam surface $g$, and an adjacent recess $g^1$. As the levers G of the different accumulators and the mechanisms controlled thereby are the same, one only will be described. The total lever G (see Figs. 4, 5 and 7) is arranged to operate a three-armed lever $G^1$ pinned to a rock shaft $G^2$ mounted at its left end in the side frame D and at its right end in another frame $D^2$. The central arm $G^3$ of the three-armed lever is provided with an anti-friction roller $g^2$ arranged to rest in the recess $g^1$ formed in the end of the total lever G, wherein it is held by a spring $G^4$ secured at one end to the depending arm $G_5$ of the three-armed lever and anchored at its other end in the side frame D.

The stop bar F, as previously stated, is arranged to be swung into and out of engagement with the lugs $e$ on the accumulator wheels and for this purpose is formed at its opposite ends with a pair of arms $F^1$ pivotally mounted to a cross shaft $F^2$ extending between the side frames D. Normally the bar is held out of engagement with the accumulator by the three-armed lever $G^1$ which, for this purpose, has its upper arm formed at the top with an inwardly extending lip $g^3$ projecting into the path of a long finger $F^3$ formed at the lower edge of the right hand supporting arm $F^1$ of the stop bar. The stop bar F normally is held out of engagement with the accumulator wheels against the tension of a spring $f$ secured at one end to a downward extension $f^1$ of the right hand stop bar supporting arm $F^1$ and anchored at its opposite end in the side frame, the spring $G^4$ which holds the three-armed lever $G^1$ in normal position, being sufficiently strong to overcome the tension of the spring $f$. However, when the total lever is moved to the totalling position (see Fig. 4), the three-armed lever $G^1$ is cammed downwardly, releasing the stop bar F which thereupon is moved under the action of its associated spring $f$, into the path of the lugs $e$ on the digit wheels, the active position of the stop bar being determined by a pin $f^2$ fixed in the side frame and against which the upper edge of the arm extension $f^1$ abuts. As the machine cycle of operation is inaugurated, the accumulator selected for totalling is lowered into engagement with the underlying rack bars $D^1$ prior to their rearward movement and, when such movement occurs, the accumulator wheels are rotated in a counter-clockwise direction until arrested, as already described, by the banking of their respective lugs $e$ against the edge of the stop bar F.

In printing a negative amount registered in an accumulator, the same preparatory operations are effected by the total lever G as before, but in this case too, other devices are brought under the control of the total lever automatically and which, upon operation of the latter, will condition the machine to effect the disengagement of the printing mechanism H from the lower set of auxiliary rack bars $H^4$ (those operable in printing a positive total) and the engagement thereof with the upper set of auxiliary rack bars K which are instrumental in printing the complement of the negative amount. The additional devices just referred to are brought under the control of the total lever G by the new character unit to which reference has been made before. Suffice it to say at the moment, when an accumulator registers a negative amount, an arm L (Figs. 5, 6 and 7) arranged adjacent the left end of the accumulator and fixed to a rock shaft $L^1$ extending transversely between the side frames D is caused to swing in a clockwise direction to bring a finger $L^2$ arranged at the right end of said shaft into the path of a second lip $g^4$ formed on the upper arm of the three-armed lever $G^1$ mentioned before, and simultaneously therewith another arm $L^3$ pinned at the left end of the rock shaft will be moved to bring a lip $l$ formed at the upper end thereof into engagement with a projection $k$ formed on the lower edge of a character link $K^1$ slidably mounted on the side frame and which is common to all of the accumulators. The arm $L^3$ is moved against the tension of a spring $l^1$ attached at one end to a downwardly extending portion thereof and anchored at its opposite end in the side frame D. As long as the accumulator remains negative, this position of the arm $L^3$ will be maintained, but, should the accumulator go positive prior to the totalling operation, the parts will be restored to normal position by the spring $l^1$ just referred to.

The active position of the arm $L^3$, that is, wherein its lip $l$ is just engaging the lug $k$ on the character link $K^1$, is shown in Fig. 6 and, when the parts are in this position and the total lever G operated, the three-armed lever $G^1$ will be cammed downwardly as before described, and the lip $g^4$ thereon will engage the finger $L^2$ to rotate the rock shaft $L^1$ further in a clockwise direction, with the result that the character link $K^1$ will be actuated rearwardly to condition the printing mechanism for printing the complement of the amount in the accumulator.

The link $K^1$ is slidably mounted on the machine frame for limited longitudinal movement, as determined by a pin and slot connection $k^1$, and is held resiliently in its forward position by a pull spring $k^2$. At its rear end, the link is connected to the vertical arm of a bell crank lever $K^2$ which is pivoted to a stud $K^3$ located in a fixed bracket $K^{14}$ (Figs. 8, 9 and 12). The horizontal arm of the lever $K^2$ is provided with a roller $K^{13}$ which tracks upon the upper edge of a rocker arm K, the latter being pivotally attached to a fore-and-aft rack plate $K^5$ and held against the roller $K^{13}$ by a pull spring $k^3$. When the link $K^1$ occupies its forward position, the rocker arm $K^4$ assumes the position shown in dotted lines in Fig. 8, and is thus inactive, but, when said link is pushed rearwardly, the arm $K^4$ is rocked downwardly against the tension of the spring $k^3$ into the path of a stud $k^4$ mounted at the upper end of a lever $K^6$ pivoted on the side frame of the machine. At its lower end, the lever $K^6$ is provided with a roller $K^7$ which is arranged to track upon an edge cam $K^8$ mounted on the main drive shaft of the machine and held in contact therewith by a spring.

The rack plate $K^5$ is formed with slots $k^5$, $k^6$ and also mounted for longitudinal movement on a fixed stud $k^7$ and cross rod $k^8$ which engage said slots respectively. A spring $k^9$, anchored to the stud $k^7$ and attached to the rear end of the plate $K^5$, tends to pull it forwardly and holds it resiliently in the position shown in Fig. 8. The rack plate $K^5$ is formed in its lower edge with teeth $k^{10}$ which mesh with a gear segment $K^9$ which is formed with a lower extended portion $K^{10}$ and pivoted on a fixed axis $K^{11}$. The extension $K^{10}$ is provided with a cam slot $K^{12}$, wherein one end of a shaft $H^5$ which supports the type bar adjusting gears $H^3$ is engaged.

When the rocker arm $K^4$ has been brought into registry with the pin $k^4$ carried by the lever $K^6$ in the manner just described by the operation of a total lever associated with an accumulator wherein a negative amount is registered, the cam $K^8$ will, upon the operation of the machine, be rotated and thereby actuate the rocker arm $K^4$ and the rack plate $K^5$ rearwardly. As a result, the gears $H^3$, through the medium of the segment $K^9$ and its extension $K^{10}$, will be cammed upwardly out of engagement with the rack bars $H^4$ and into engagement with the upper rack bars K, which now will control the adjustment of the type bars (see Fig. 3). After the printing operation and the restoration of the total lever to its normal position, the spring $k^2$ is allowed to return the link $K^1$ and raise the rocker arm $K^4$ out of the path of the stud $k^4$, so that the rack plate $K^5$ will be unaffected by the lever $K^6$ during succeeding cycles or until another negative amount is to be totalled.

Thus far the machine, except as will be hereinafter pointed out, is the same as that disclosed in the copending application referred to before, and reference may be had thereto for a more detailed description of the parts and the actuating mechanism therefor.

The character unit and the manner in which it conditions the printing mechanism for printing the complement of a negative amount will now be described. This unit (see Figs. 5, 6 and 7) includes in part a wheel $L^4$ somewhat similar to the digit wheels of the accumulators, except that it is not provided with numerals, but instead has a plus and a minus indication arranged in positions corresponding respectively to the zero and nine numeral positions on the digit wheels. Like the digit wheels, it is loosely mounted on the same shaft $E^1$ and is formed with a lug $l^2$ just fore of the plus indication and has also a pinion $l^3$ arranged to mesh with an extra rack bar $L^5$ similar to and operated in the same manner as the other main rack bars $D^1$ of the machine. At the left, the character wheel $L^4$ is provided with a plate $L^6$, on the outer face of which is an anti-friction roller $L^7$ adapted to cooperate with the arm L active in rotating the shaft $L^1$ that positions the arm $L^3$ which operates the character link $K^1$ and also with an angular detent $L^8$ pivotally mounted on the cross shaft $F^2$ immediately adjacent the arm L. The arm L is formed at its outer end with a raised cam portion $l^4$ normally positioned in the path of the anti-friction roller $L^7$ and a slight recess $l^5$ just below the cam surface $l^4$ and a heel portion $l^6$ which, in the normal position of the parts, receives at its base a pin $l^7$ extending laterally from the face of the angular detent $L^8$. A light pull spring $l^8$ fastened to the detent $L^8$ urges the pin $l^7$ against the heel portion of the arm L and the latter is thus held against the tension of the spring $l^1$ against rotation in a counter-clockwise direction.

When the accumulator registers a positive amount, the wheel $L^4$ of the character unit will register plus and, under such circumstances, as the accumulator is lowered into engagement with the rack bars, the anti-friction roller $L^7$ thereon will rest in the recess $l^5$ just beneath the cam surface $l^4$. The character wheel is connected in any suitable manner with the digit wheel of highest order of the associated accumulator in such a way that it will be moved through the equivalent of one space from plus to minus in a counter-clockwise direction when the digit wheel of highest order passes from zero to 9 during a subtraction operation or one space in a clockwise direction from minus to plus when the digit wheel of highest order passes from 9 to zero during an operation in addition. Any well known carrying mechanism will effect this result and, should the carrying mechanism shown in applicant's copending application be employed, the carrying to the character wheel will be effected from the digit wheel of highest order through the extra rack bar $L^5$. A detailed carrying mechanism has not been disclosed in the instant application, since it would unduly complicate the drawings and since it would not help at all in the understanding of the instant invention.

Now it will be apparent that when subtraction occurs in an accumulator to register therein a negative amount, the digit wheel of highest order will rotate from zero to 9 in a counter-clockwise direction, with the result that a carry-over will be effected into the wheel $L^4$ of the character unit, moving the same through one space or to a position where minus will be registered and, in doing so, the parts will be actuated from the positions shown in Fig. 5 to those shown in Fig. 6, where the anti-friction roller $L^7$ has cammed the arm L downwardly and thereby permitted the angular detent $L^8$ to turn under the influence of its associated spring until it is arrested by the banking of a depending finger $l^9$ thereon against a stop $l^{10}$ fixed in the frame of the machine, and in this position of the parts the pin $l^7$ will hold the arm L downwardly as long as the amount registered in the accumulator remains negative.

It will be recalled that in this downward position of the arm L, the devices which condition the printing mechanism for printing the complement of a negative amount in an accumulator are brought under the control of the total lever G and, when the parts are in this position should a total be taken, such complement will be printed. If before the accumulator is totalled, it again registers a positive amount, as by the addition of an amount in excess of the negative amount, the digit wheel of highest order will rotate from 9 to zero in a clockwise direction, with the result that there will be a carry-over into the wheel $L^4$ of the character unit, causing said wheel to move the equivalent of one space in the same direction to display the plus sign. When such movement of the character wheel occurs, the anti-friction roller $L^7$ will engage the edge of the angular detent $L^8$, camming the latter downwardly against the tension of its light pull spring $l^8$, permitting the arm L to return to normal position with the pin $l^7$ resting adjacent the rear edge of the heel portion $l^6$ thereof.

Now it will be seen that, due to the shape of the cam edge $l^4$ on the arm L, the latter can be depressed to condition the printing mechanism for printing a negative total when the character wheel $L^4$ is rotated from the plus position to the minus position in a clockwise direction through nine spaces and likewise, if the parts are already conditioned for printing a negative total, they may be returned to the positive condition by the movement of the character wheel from minus to plus during the rotation thereof through nine spaces in a counter-clockwise direction. This is important during the transfer of negative amounts from one accumulator to another, for in such case, a negative amount may be registered when an accumulator is actuated in addition, as for instance, when the negative amount in one accumulator is transferred by addition into a second accumulator. Should the amount in the second accumulator and which represents the algebraic sum be negative, it is necessary that such accumulator be placed in condition to print the complement of such negative amount. Likewise, when a negative amount is transferred from one accumulator to another by subtraction, the amount in the second accumulator and which represents the algebraic difference may be positive, and in this case also it is necessary that the second accumulator should be in condition to print such positive amount when totalled.

In order to insure that the character unit of the accumulator into which an amount is transferred be properly conditioned to effect the printing of the proper amount when such accumulator is totalled, that is, the amount registered if positive or the complement thereof if negative, means are provided controlled from the accumulator from which the amount is transferred properly to effect such conditioning. The means in question includes the extra rack bar $L^5$ referred to before and which is exactly the same as the other main rack bars $D^1$ of the machine, and arranged to operate in exactly the same manner, except that there need be no corresponding type carrier, such as the other rack bars have, or intermediate auxiliary rack bars unless, indeed, it is desired actually to print the character of the amount in the accumulator being totalled. If it is desired to print the plus and minus signs, this can readily be done by providing an additional type carrier $H^6$ actuated from the extra rack bar $L^5$ through subsidiary rack bars $H^7$ and $K^{15}$ similar to the bars $H^4$ and K (see Figs. 17 and 18). Of course, with such an arrangement, it would not be necessary to equip the upper auxiliary rack bar $K^{15}$ with an interponent similar to the interponents T with which the other bars are equipped. Thus, the rack bar $L^5$ is the same as the other rack bars $D^1$, being common to all of the accumulators, having the same range of movement as the other rack bars, being normally held against rearward movement during an addition or a subtraction operation, and released during a totalling operation, under which circumstances it is controlled in its rearward movement by the wheel of the character unit associated with the accumulator being totalled in exactly the same way as the other rack bars are controlled by their associated digit wheels. Furthermore, as previously stated, it is arranged to be moved through an additional space in either direction under the control of the digit wheel of highest order in the accumulator with which it is associated when the transfer of an amount to such accumulator indicates a carry-over, and after a carry-over in subtraction, like the other rack bars it is arranged to be restored one space to its position before the carry-over, prior to the engagement of an accumulator with the rack bars for operation in addition, so that an amount can be transferred from one accumulator to another by subtraction and into a third by addition during one cycle of operation of the machine.

Perhaps the best way to describe this mechanism is by referring to several concrete examples. Thus, referring to Fig. 13, three accumulators A, B and C are illustrated, accumulator B having a negative amounted registered therein, accumulator A, a positive amount and accumulator C likewise a positive amount but smaller in intrinsic value than the actual negative amount represented by the amount in accumulator B. Furthermore, let it be assumed that it is desired to transfer the negative amount from accumulator B into accumulator A by subtraction and into accumulator C by addition. The complement of the amount 99947800 in accumulator B is 00052200 and, if this amount is subtracted from the amount in accumulator A, having due regard for signs, the following result is obtained:

$$+90065200$$
$$-(-)00052200$$
$$\overline{+90117400}$$

In other words, this constitutes an algebraic subtraction and the algebraic difference is a positive quantity. As it is a positive quantity, the amount +90117400 should be registered in accumulator A after the transfer operation and the character unit of accumulator A should now be set to condition the parts for printing the amount registered therein if accumulator A is totalled.

Again, if the complement of the amount in accumulator B is added to the amount in accumulator C, with due regard for signs, the following result is obtained:

$$+00035200$$
$$+(-)00052200$$
$$\overline{-00017000}$$

In this case the result is the algebraic sum and is a negative quantity, and after the transfer operation, accumulator C should register —99983000, and the character units at this time should be set to condition the printing mechanism to print the complement of such amount or 00017000 should accumulator C be totalled.

The condition of the character units of the different accumulators for the respective amounts registered prior to the transfer operation is illustrated in Fig. 8. In accumulators A and C, the wheels $L^4$ of the character units indicate that the amounts therein are positive and at this time, if accumulators A and C were totalled, such positive amounts would be printed. In accumulator B however, the character wheel indicates that the amount registered is negative and the parts are set so that upon totalling this accumulator, the complement of the amount therein will be printed.

For the transfer operation before alluded to, however, accumulator B is totalled by pressing the total lever G of said accumulator rearwardly, and accumulators A and C conditioned respectively for subtraction and addition by depressing the subtract key $E^4$ of accumulator A and the add key $E^3$ of accumulator C. Now when the machine is operated, accumulators A and B are lowered into engagement with the rack bars $D^1$, and the character wheels $L^4$ thereof into engagement with the extra rack bar $L^5$ in the manner previously described. The rack bars $D^1$ will move rearwardly under the control of accumulator B and the extent of such movement will be determined by the rotation of the digit wheels in a counter-clockwise direction from their initial settings to the zero positions, where, of course, they are arrested by the lugs e thereon banking against the stop bar F. The extra rack bar $L^5$ will move rearwardly under the control of the character wheel $L^4$ of accumulator B and the extent of its movement will be determined by the extent of rotation of the character wheel in passing from the minus position to the plus position in a counter-clockwise direction, the wheel being arrested in the plus position likewise by the banking of its lug $l^2$ against the stop bar F. It will be interesting to note at this time that when a character wheel registers minus, the lug $l^2$ thereon is just in advance of the stop bar. Under the circumstances described and where the numbers registered are as previously stated (that is —99947800 in accumulator B and +90065200 in accumulator A), the rack bars $D^1$ in the first two places (starting from the right) will remain stationary and consequently, the first two digit wheels in accumulator A will continue to register zero. The third rack bar will move rearwardly through eight spaces, and the third digit wheel of accumulator A will rotate likewise through eight spaces in a counter-clockwise direction from 2 to 4. The fourth digit wheel of said accumulator will be rotated through seven spaces from 5 to 8 but, as the third digit in its rotation passed through zero, a carry-over is occasioned so that the fourth digit wheel will register 7 instead of 8. The fifth digit wheel will be rotated through four spaces from 6 to 2, but again as there was a carry-over from the fourth digit wheel, the fifth digit wheel of accumulator A will register 1. The sixth digit wheel of accumulator A will rotate through nine spaces to register 1 (there being no carry-over in this instance). The seventh digit wheel will rotate from zero through nine spaces, plus an additional space due to the carry-over, again to register zero and, in the case of the digit wheel of highest order, it likewise will rotate through nine spaces from 9 plus an added space due to the carry-over again to register 9. It will be recalled now that the original setting of the wheel $L^4$ of the character unit of accumulator B indicated the minus sign, so that it too will rotate through nine spaces until arrested in the plus position by the banking of its lug $l^2$ against the stop bar F, and the corresponding wheel of the character unit of accumulator A will likewise be rotated through nine spaces but, as there was a carry-over from the digit wheel of highest order in accumulator A, the wheel $L^4$ of the character unit of this accumulator will be actuated through an additional space again to register the plus sign, which is the proper sign of the algebraic difference resulting from the transfer. The amount now registered in accumulator A as a result of the transfer operation is +90117400, the correct amount. Now when the character unit registers plus, the parts of such unit, as previously stated, will be set so as not to come under the influence of the total lever G and, if accumulator A is now totalled, the amount registered in accumulator A as a result of the transfer operation, will be printed directly.

It might be here stated that after accumulator B has been cleared, it, as well as accumulator A, will be disengaged from the rack bars prior to the return movement of the latter and the timing of such disengagement will depend upon the type of carrying mechanism used.

Accumulator C (which registers the amount +00035200) is now engaged with the rack bars and, on the return movement of the latter, the digit wheel in the first place (from the right) of accumulator C will remain stationary and continue to register zero, as will also the second digit wheel. The third digit wheel of accumulator C will rotate through eight spaces in a clockwise direction from 2 to 0, the fourth digit wheel through seven spaces, plus an additional space due to carrying, from 5 to 3, the fifth digit wheel through four spaces, plus an additional space due to carrying, from 3 to 8, the sixth digit wheel through nine spaces from 0 to 9, and the seventh and eighth digit wheels likewise through nine spaces from 0 to 9. It will be noted that in the instance of the sixth, seventh and eighth digit wheels, no carry-over was necessary. Remembering now that the character wheel $L^4$ of accumulator C originally registered the plus sign and as this wheel, under the influence of the extra rack bar $L^5$, will rotate through nine spaces or through the same degree of rotation as the corresponding wheel of accumulator B when the negative amount therein was cleared, the character wheel of accumulator C as a result of the transfer operation will register the minus sign which is the true character of the result in the accumulator C. When the character wheel $L^4$ is in this position, the parts associated therewith are set so as to bring them under the influence of the respective total lever G and, upon operation of the latter, the complement of the amount 99983000, now registered in accumulator C, will be printed, to wit, —00017000, the true negative total.

If the machine is equipped with means for printing the character of the amount in the accumulator from which the total is taken, a minus sign will be printed in the example above given when accumulator B is totalled. Thus, referring to Fig. 18, it will be recalled that before the total transfer, the character wheel in accumulator B indicated that the amount registered therein was negative and that, under such conditions, the upper set of intermediate rack bars, which includes the bar $K^{15}$, is rendered operative when such accumulator is totalled. When the accumulator B is totalled, the extra rack bar $L^5$ moves rearwardly through nine spaces or until it is arrested by the banking of the protrusion on the character wheel $L^4$ against the stop bar F. Thereupon, the additional rack bar $K^{15}$ will move forwardly through one space, since, as previously stated, it lacks an interponent, and the type carrying element $H^6$ associated therewith will be raised through one active space to print the minus sign.

If the amount in the accumulator totalled were positive, a plus sign would be printed, as indicated in Fig. 17. Under such conditions, the character wheel $L^4$ indicates that the amount registered is positive, and consequently upon totalling, it will remain stationary, since the protrusion thereon already banks against the stop bar F. Accordingly, the rack bar $L^5$ likewise will remain stationary, and consequently the intermediate rack bar $H^7$, which now is actively associated with the type carrier $H^6$, will move through zero active spaces to locate the type carrying the positive sign in printing position. Of course, it will be understood that the printing of the positive character of the amount could be dispensed with if desired, merely by eliminating the lower rack bar $H^7$, in which case the absence of the sign would indicate the positive character of the amount.

Another example of transferring a negative amount is given in Figs. 10, 11, 15 and 16, and in this case a negative amount appearing in accumulator B and subtracted from a negative amount in accumulator C.

Here again, it will be helpful to investigate just what happens when the complements of the amounts registered (which are the true negative amounts) are added and subtracted with due regard to the signs thereof. The complements of the respective amounts in the accumulators are as follows:

| | Amount registered | Complement |
|---|---|---|
| Accumulator A | —99947800 | —00052200 |
| Accumulator B | —99956100 | —00043900 |
| Accumulator C | —99976500 | —00023500 |

Adding the complements of the amounts in accumulators A and B gives the following results:

```
        —00043900
    +(—)00052200
    ─────────────
        —00096100
```

Thus, the algebraic sum of this operation results in a negative quantity.

Now subtracting the complement of the amount in accumulator A from the complement of the amount in accumulator C, gives the following result:

```
        —00023500
    —(—)00052200
    ─────────────
        +00028700
```

Thus, the algebraic difference of this operation results in a positive quantity.

Referring now to Fig. 10, it will be seen that the character units of the three accumulators are set for the conditions represented by Fig. 15, that is, all of the wheels $L^4$ of the character units register the minus sign and the parts are set so that should any accumulator be totalled, the complement of the amount registered therein would be printed. Let it be assumed, however, that it is desired to total accumulator A and transfer the amount therein to accumulator C by subtraction and to accumulator B by addition, which operation can be brought about as previously described, by operating the total lever G of accumulator A, the subtract key $E^4$ of accumulator C and the add key $E^3$ of accumulator B. Upon the operation of the machine, the accumulators A and C will be engaged with the rack bars $D^1$ prior to the movement of the latter in the rearward direction, and the extent of movement of the rack bars will be determined by the extent of rotation of the digit wheel of accumulator A in clearing.

Thus (recalling that the amounts registered in accumulators A and C respectively are —99947800 and —99976500) the digit wheels of accumulator C in the first two places starting from the right will remain stationary, continuing to register zero. The third digit wheel of accumulator C will be rotated counter-clockwise from 5 through eight spaces to register 7, the fourth digit wheel through seven spaces, plus an additional space due to carrying (as the previous digit wheel passed the zero) from 6 to 8, the fifth digit wheel through four spaces, plus an additional space due to carrying from 7 to 2, the sixth digit wheel through nine spaces from 9 to 0, there being no carry-over required in this instance. The digit wheels in the seventh and eighth places will likewise rotate through nine spaces from 9 to 0. The extra rack bar $L^5$ will be actuated rearwardly under the control of the wheel $L^4$ of the character unit associated with accumulator A, which wheel will rotate in a counter-clockwise direction from the position in which it displays the minus sign until arrested by the engagement of its lug $l^2$ against the stop bar F, in which position it will display the plus sign and, as such rotation is the equivalent of nine spaces, the extra rack bar $L^5$ will likewise move rearwardly through nine spaces to rotate the wheel $L^4$ of the character unit of accumulator C (which was engaged with said rack bar during this movement) through nine spaces from the minus to the plus position. As there was no carry-over from the digit wheel of highest order in accumulator C, the plus sign will be the character of the amount registered in accumulator C as a result of the transfer operation. This amount (see Fig. 16) is +00028700 and is the correct algebraic difference resulting from the subtraction operation. With the character unit of accumulator C registering plus, it will be seen (see Fig. 11) that the character unit is no longer under the control of the total key G, so that now, if accumulator C is totalled, the positive amount registered therein will be printed.

Now it will be recalled, the negative amount in accumulator A was also to be transferred by addition into accumulator B (which contained the amount —99956100). After those rack bars $D^1$ which were active in carrying in accumulator C are restored to their positions prior to the carrying operation, accumulator B is engaged therewith and, as the bars are returned to normal position, the amount originally in accumulator A will be added into accumulator B. Thus as before, the rack bars in the first two places are held stationary and the corresponding digit wheels in accumulator B will continue to register zero. The third digit wheel of accumulator B will be rotated through eight spaces from 1 to 9, the fourth digit wheel will rotate through seven spaces from 6 to 3, the fifth digit wheel through four spaces, plus an additional space due to carrying from the fourth wheel (as the latter in its rotation passed through zero) from 5 to 0, the sixth digit wheel will rotate through nine spaces, plus an additional space due to carrying from 9 to 9, and the seventh and eighth digit wheels will be likewise rotated through nine spaces, plus an additional space for carrying, from 9 to 9. The wheel $L^4$ of the character unit of accumulator B will likewise be rotated through nine spaces, plus an additional space due to a carry-over from the wheel of highest order (since the latter in rotating from 9 to 9 passed through zero) and will again display the minus sign. The amount now registered in accumulator B as a result of the transfer operation is —99903900 (see Fig. 16). The condition of the character unit of accumulator B after the transfer operation is shown in Fig. 11 and, as the minus sign is displayed, the character unit is under the control of the total lever G associated with such accumulator. If accumulator B is now totalled, the complement of the amount registered therein will be printed, such complement being —00096100, which is the true negative amount resulting from the algebraic addition of the two negative numbers represented by the amounts appearing in accumulators A and B prior to the transfer operation.

In the examples given, there has been illustrated a condition wherein an amount is transferred from one accumulator to a second accumulator by addition and to a third accumulator by substraction in one cycle of operation of the machine. Should a carrying mechanism similar to that disclosed in applicant's copending application be used, an amount could be transferred from one accumulator to but one other accumulator by addition and to a third by subtraction, since the carrying mechanism referred to is common to all of the accumulators and consequently can operate with only one accumulator at a time. However, should the accumulators be provided with their own individual carrying mechanisms, which indeed is common in many commercial machines, an amount could be transferred from one accumulator to a plurality of accumulators by addition and to a plurality of other accumulators by subtraction in one cycle of operation of the machine. By way of example, the accumulator with the carrying mechanism disclosed in the Gardner patent, No. 1,828,180, issued October 20th, 1931, could be readily substituted in applicant's machine without any substantial change in the parts.

As shown in Fig. 5, the machine is equipped with the usual alinement bars L⁹ positioned above the accumulators and formed with depending projections L¹⁰ to engage in notches formed on the digit wheels between the respective numbers to hold the digit wheels against rotation when the accumulators are in the raised position out of engagement with the rack bars D¹ and, if desired, similar notches l¹¹ may be provided in the wheels of the character units for this purpose. Two only are shown in Fig. 5, as in contemplation the wheels of the character units at any time will register only the plus or the minus sign.

In order to insure that the wheels L⁴ of the character units register either the plus or the minus sign only, there are provided angular-shaped pawls L¹¹ (one for each character unit and hereinafter termed "limit pawls") pivotally secured adjacent their centers to the side frame of the machine and having their horizontal arms formed with notches l¹² arranged to receive pins l¹³ extending laterally from the anti-friction rollers L⁷, with which the character wheels are provided, when the accumulators are lowered into engagement with the actuating rack bars (see Figs. 5, 6 and 12). The length of the notches l¹² is such that the character wheel will be permitted normally to rotate only through one space from plus to minus or from minus to plus, any further rotation being prevented. Thus, the character wheels at all times will display either the plus or the minus sign. However, during a transfer operation where the character wheels may be required to rotate through more than one space as previously described, the limit pawls L¹¹ are arranged to be disengaged from their respective character wheels to permit the required rotation thereof. This disengagement is brought about by the rearward movement of the character link K¹ which, for the purpose, is provided in its lower edge with depending projections K² notched at their lower ends to engage pins l¹⁴ carried at the lower ends of the vertical arms formed on the limit pawls L¹¹. The arrangement is such that upon totalling an accumulator wherein there is registered a negative amount in the manner previously described, the character link K¹, as it is moved rearwardly, will rock the limit pawls, thereby releasing all of the character wheels so that the latter may rotate freely during the transfer of negative totals. As the character link K¹ is restored to its normal position at the conclusion of a cycle of operation, the limit pawls are likewise restored to the position wherein their notches l¹² are again ready to receive the pins associated with the character wheels upon the engagement of any of the accumulators with the actuating rack bars.

The limit pawls L¹¹, just referred to, can be dispensed with if desired, and when the machine is not so equipped, the character wheels will be free to rotate beyond the plus sign when the capacity of an accumulator is exceeded in addition or beyond the minus sign when the capacity of an accumulator is exceeded in subtraction. Where the capacity of an accumulator has been exceeded, the absence of the plus or minus sign will indicate such abnormal condition to the operator who can rectify it accordingly.

In the accompanying drawings, the invention has been shown merely by way of example and in preferred form and, obviously, many variations and modifications may be made therein which will still be comprised within its spirit. For instance, a printing mechanism has been disclosed, but it is to be understood that for it there could be substituted a recording mechanism with convenient reading dials if desired and, where the claims refer to a recording mechanism, it is apparent that such term refers to a printing mechanism as well. It is to be understood, therefore, that the invention is not limited to any specific form or embodiment, except insofar as such limitations are specified in the appended claims.

This application is a continuation in part of my copending application, Serial No. 625,590, referred to before.

Having thus described my invention, what I claim is:

1. In a machine of the class described, the combination of an accumulator, a second accumulator, recording mechanism, means associated with the second accumulator to control certain elements of the recording mechanism for recording the amount therein if positive or the complement of said amount if negative, means for transferring a negative total from the first accumulator to the second accumulator, and means for automatically setting said controlling means according as the result of said total transfer into the second accumulator is positive or negative to determine its control over elements of the recording mechanism for recording said result.

2. In a machine of the class described, the combination of an accumulator, a second accumulator, recording mechanism, means associated with the second accumulator to control certain elements of the recording mechanism for recording the amount therein if positive or the complement of said amount if negative, means for transferring a negative total from the first accumulator to the second accumulator, and means controlled from the first accumulator for setting said controlling means according as the result of said total transfer into the second accumulator is positive or negative to determine its control over elements of the recording mechanism for recording said result.

3. In a machine of the class described, the combination of a plurality of accumulators, each operable in addition and subtraction, recording mechanism, means associated with each accumulator to control elements of said recording mechanism for recording the amount therein if positive or the complement thereof if negative, means for transferring a total registered in any accumulator whether it be positive or negative to another accumulator to register in the latter an amount representing the algebraic sum or difference of the amounts in the two accumulators, and means for automatically setting the controlling means associated with the latter accumulator according as the amount registered therein as a result of a transfer is positive or negative to determine its control over elements of the recording mechanism for recording said algebraic sum or difference as the case may be.

4. In a machine of the class described, the combination of a plurality of accumulators, each operable in addition and subtraction, recording mechanism, means associated with each accumulator to control elements of the recording mechanism for recording the amount therein if positive, or the complement thereof if negative, means for transferring a total registered in any accumulator whether positive or negative to another accumulator to register in the latter an amount representing the algebraic sum or difference of the amounts in the two accumulators, and means controlled by the accumulator from which a total is transferred for setting the controlling means associated with the other accumulator according as the amount therein is positive or negative as a result of a total transfer to determine its control over elements of the recording mechanism for recording said algebraic sum or difference as the case may be.

5. In a machine of the class described, the combination of an accumulator, two other accumulators associated therewith, recording mechanism, means associated with the last two mentioned accumulators to control elements of said recording mechanism for recording the amounts therein if positive or the complements of the amounts therein if negative, means for transferring a negative total from the first accumulator to one of the second mentioned accumulators to register therein an amount representing the algebraic sum of the amounts in said accumulator and the first mentioned accumulator, and to the other of the second mentioned accumulators to register therein an amount representing the algebraic difference of the amounts in said other accumulator and the first mentioned accumulator, and means for automatically setting the controlling means according as the respective amounts registered in the two last mentioned accumulators as a result of said transfer are positive or negative to determine the control over said elements of the recording mechanism for recording said algebraic sum and difference.

6. In a machine of the class described, the combination of an accumulator, two other accumulators associated therewith, recording mechanism, means associated with each of the two second mentioned accumulators to control elements of said recording mechanism for recording the amounts therein if positive or the complements of the amounts therein if negative, means for transferring a negative total from the first accumulator to one of the second mentioned accumulators to register therein an amount representing the algebraic sum of the amounts in said accumulator and the first mentioned accumulator and to the other of said second mentioned accumulators to register therein an amount representing the algebraic difference of the amounts in said accumulator and the first mentioned accumulator, and means controlled from the first accumulator for setting said controlling means according as the respective amounts registered in the two second mentioned accumulators as a result of said transfer are positive or negative to determine the control over said elements of the recording mechanism for recording said algebraic sum and difference.

7. In a machine of the class described, the combination of a series of accumulators, each operable in addition and subtraction, recording mechanism, means associated with each accumulator to control elements of said recording mechanism for recording the amount therein if positive or the complement thereof if negative, means for transferring the total in one accumulator whether it be positive or negative to a second accumulator to register therein an amount representing the algebraic sum of the amounts in said first and second accumulators, and to a third accumulator to register therein an amount representing the algebraic difference of the amounts in said first and third accumulators, and means for automatically setting the controlling means associated with the second and third accumulators according as the respective amounts registered therein are positive or negative as a result of a total transfer to determine the control over elements of the recording mechanism for recording said algebraic sum and difference.

8. In a machine of the class described, the combination of a series of accumulators, each operable in addition and subtraction, recording mechanism, means associated with each accumulator to control elements of the recording mechanism for recording the amount therein if positive, or the complement thereof if negative, means for transferring the total in one accumulator whether it be positive or negative to a second accumulator to register therein an amount representing the algebraic sum of the amounts in the said first and second accumulators, and to a third accumulator to register therein an amount representing the algebraic difference of the amounts in said first and third accumulators, and means controlled from the first accumulator for setting said controlling means associated with the second and third accumulators according as the respective amounts registered therein as a result of a total transfer are positive or negative to determine the control over elements of the recording mechanism for recording said algebraic sum and difference.

9. A combination according to claim 1, wherein the accumulators are actuated through common rack bars, and wherein the means for setting the controlling means include an extra rack bar controlled in its movement by the first accumulator.

10. In a machine of the class described, the combination of an accumulator, recording mechanism, means controlled from said accumulator for adjusting elements of said recording mechanism to record the complement of a negative total therein and to transfer said total to a second accumulator, and mechanism associated with the second accumulator adapted to control said elements of the recording mechanism for recording the amount in the second accumulator or the complement thereof according as the result of the transfer operation is positive or negative.

11. A combination in accordance with claim 10, wherein the mechanism associated with the second accumulator is controlled from the first accumulator.

12. A combination in accordance with claim 10, wherein the recording operation controlled by the first accumulator and the total transfer operation are effected in the same machine cycle of operation.

13. In a machine of the class described, the combination of a plurality of accumulators, means associated with each accumulator for indicating the character of the amount therein whether positive or negative, means for transferring an amount from one accumulator to another accumulator, and means controlled by the character indicating means of the accumulator from which the amount is transferred for operating the character indicating means of the accumulator to which the amount is transferred.

14. In a machine of the class described, the combination of a plurality of accumulators, means associated with each accumulator for indicating the character of the amounts therein whether positive or negative, means for transferring amounts from one accumulator to another accumulator, and a device common to all of the character indicating means for effecting the control of one character indicating means by the other during a transfer operation.

15. In a machine of the class described, the combination of an accumulator, means associated with the accumulator for indicating the character of the amount therein whether positive or negative, means operable upon totaling for recording the amount registered in the accumulator, and mechanism controlled by the character indicating means for recording the character of the registered amount during such totalling operation.

16. In a machine of the class described, the combination of a plurality of accumulators, means associated with each accumulator for indicating the character of the amount therein whether positive or negative, a device common to the character indicating means of such accumulators, and means operable upon totalling a selected accumulator and acting through the common device for recording the character of the amount in the selected accumulator.

17. In a machine of the class described, the combination of an accumulator operable to register positive and negative amounts by addition or subtraction, recording mechanism, and devices to control elements of the recording mechanism for recording the amount registered in the accumulator if positive or the complement thereof if negative, said devices including means settable under the control of the accumulator in one position or another depending upon the character of the amount therein whether positive or negative and irrespective of whether such amount has been registered as a result of an item entering operation or a total transfer operation either by addition or subtraction, and a device for maintaining said means in its different set positions.

18. In a machine of the class described, the combination of an accumulator operable to register positive and negative amounts by addition or subtraction, recording mechanism, and devices to control elements of the recording mechanism for recording the amount registered in the accumulator if positive or the complement thereof if negative, said devices including means settable under the control of the accumulator in one position or another depending upon the character of the amount therein whether positive or negative and irrespective of whether such amount has been registered as a result of an item entering operation or a total transfer operation either by addition or subtraction, and a detent likewise controlled from the accumulator for maintaining said means in its different set positions.

19. In a machine of the class described, the combination of an accumulator operable to register positive and negative amounts, a character indicating device associated with the accumulator and adapted in one position to indicate the positive character of the amount in said accumulator and in another position to indicate the negative character of the amount in said accumulator, means adapted during the registering of amounts in the accumulator to limit the movement of the character indicating device between its two indicating positions, and mechanism for rendering said means inactive when clearing the accumulator of a negative amount.

20. In a machine of the class described, the combination of an accumulator operable to register positive and negative amounts, recording mechanism, devices including an element adapted upon totalling the accumulator and when a negative amount is registered therein to set certain elements of the recording mechanism to record the complement of said negative amount, a character indicating device associated with the accumulator and adapted in one position to indicate the positive character of the amount in said accumulator and in another position to indicate the negative character of the amount in said accumulator, means adapted during the registering of amounts in the accumulator to limit the movement of the character indicating device between its two indicating positions, and a connection between said means and said element, whereby said means is rendered inactive upon totalling the accumulator when a negative amount is registered.

21. In a machine of the class described, the combination of a plurality of accumulators operable to register positive and negative amounts, a character indicating device associated with each accumulator and adapted in one position to indicate the positive character of the amount in its associated accumulator and in another position to indicate the negative character of the amount in the associated accumulator, means associated with each character indicating device and adapted during the registering of amounts in the associated accumulator to limit the movement thereof between its two indicating positions, and mechanism common to the respective limiting means for rendering them inactive when clearing the accumulators of negative amounts.

ANSGAR F. STURM.